(12) United States Patent
Forsythe et al.

(10) Patent No.: US 9,756,834 B2
(45) Date of Patent: Sep. 12, 2017

(54) PET TOY WITH EDIBLE AND/OR DIGESTIBLE COMPONENTS

(71) Applicants: Lisa Mary Forsythe, Oconomowoc, WI (US); Patrick John Forsythe, Oconomowoc, WI (US)

(72) Inventors: Lisa Mary Forsythe, Oconomowoc, WI (US); Patrick John Forsythe, Oconomowoc, WI (US)

( * ) Notice: Subject to any disclaimer, the term of this patent is extended or adjusted under 35 U.S.C. 154(b) by 94 days.

(21) Appl. No.: 14/845,419

(22) Filed: Sep. 4, 2015

(65) Prior Publication Data
US 2016/0066540 A1   Mar. 10, 2016

Related U.S. Application Data

(60) Provisional application No. 62/045,686, filed on Sep. 4, 2014.

(51) Int. Cl.
*A01K 29/00* (2006.01)
*A01K 15/02* (2006.01)
*A23K 1/10* (2006.01)
*A23K 50/40* (2016.01)

(52) U.S. Cl.
CPC ............ *A01K 15/026* (2013.01); *A23K 1/106* (2013.01); *A23K 50/40* (2016.05)

(58) Field of Classification Search
CPC .................................................. A01K 15/026
See application file for complete search history.

(56) References Cited

U.S. PATENT DOCUMENTS

| | | | | |
|---|---|---|---|---|
| 4,816,000 A * | 3/1989 | Hsu | ........................ | A63H 3/005 206/457 |
| 8,074,609 B2 * | 12/2011 | Adkins | ................ | A01K 15/026 119/707 |
| 8,904,966 B2 * | 12/2014 | Kolozsvari | .......... | A01K 15/026 119/710 |
| 9,004,012 B2 * | 4/2015 | Taylor | .................. | A01K 15/026 119/710 |
| 9,119,377 B2 * | 9/2015 | Gratza | ................. | A01K 15/026 |
| 9,226,480 B2 * | 1/2016 | Axelrod | ............... | A01K 15/025 |
| 2004/0142073 A1 * | 7/2004 | Buchanan | ............ | A01K 15/026 426/104 |
| 2007/0234965 A1 * | 10/2007 | Aguilar | ................ | A01K 1/0107 119/61.5 |
| 2010/0147229 A1 * | 6/2010 | DeFazio | ............... | A01K 15/025 119/710 |
| 2011/0232582 A1 * | 9/2011 | Adkins | ................ | A01K 15/026 119/710 |
| 2013/0149418 A1 * | 6/2013 | Carlson | ................ | A01K 15/026 426/140 |
| 2014/0345538 A1 * | 11/2014 | Axelrod | ............... | A01K 15/025 119/709 |
| 2015/0053143 A1 * | 2/2015 | Gratza | ................. | A01K 15/025 119/709 |
| 2015/0181839 A1 * | 7/2015 | Baikie | .................. | A01K 15/026 119/710 |

(Continued)

*Primary Examiner* — Kristen C Hayes
(74) *Attorney, Agent, or Firm* — McCarter & English, LLP

(57) ABSTRACT

Disclosed herein is an animal toy having an outer cover defining a chamber that contains a filling material and a noise making device. The outer cover, the filling material, and/or the noise making device can be made of at least one material that is edible for an animal. In some embodiments, the outer cover is reusable.

13 Claims, 2 Drawing Sheets

(56) References Cited

U.S. PATENT DOCUMENTS

2015/0373950 A1* 12/2015 Spring .................. A23K 40/00
  119/710
2016/0143251 A1* 5/2016 Larson ................. A23K 1/1846
  119/709

* cited by examiner

PET TOY WITH EDIBLE AND/OR DIGESTIBLE COMPONENTS

CROSS-REFERENCE TO RELATED APPLICATIONS

The present application claims the benefit of priority to U.S. Provisional Patent Application No. 62/045,686, filed Sep. 4, 2014, the entire contents of which are incorporated herein by reference.

BACKGROUND

1. Technical Field

This invention relates to animal toys, and more particularly, to an animal toy that makes a sound when the toy is manipulated.

2. Background Art

It is known for animal owners and those responsible for animals to provide toys for these animals to play with. It appears that such toys provide the animal with a fun and enjoyable experience that in some ways appeal to the instinctual nature of the animal. One of the types of toy that is most common, and that is the most enjoyable for the animal, is of a construction that has an outer cover or skin, stuffed with a soft, chewable filling material and with a device enclosed that makes noise as the animal manipulates the toy.

As an animal plays with a toy of the construction as outlined above, after some amount of time the outer cover often becomes breached, and the filling material and noise making device are ripped out by the animal. Indeed, it appears that much of the enjoyment the animal experiences from the toy is derived from removing the inner components from the outer cover, which seems to be instinctual to the animal. As the filling material and/or the noise making device are removed from the outer cover of the toy, these components often make a mess that must be cleaned up by the owner or manager of the animal. Also, these components, particularly the noise making device, pose a choking hazard for the animal, and may cause harm to the animal if ingested.

SUMMARY OF THE INVENTION

The present invention overcomes the disadvantages and shortcomings of the prior art by providing an animal toy made of edible or digestible components.

In some embodiments, provided is an animal toy, comprising a reusable outer cover defining an interior, the interior containing a filling material and a noise making device. One or more of the outer cover, the filling material, or the noise making device is made of a material that is edible for an animal. In some embodiments, the outer cover, the filling material, and the noise making device are each made entirely of at least one edible material. In some embodiments, the edible material is also digestible, so to provide nutritional value to the animal.

By way of a first non-limiting example, a reusable outer skin can be provided that that is non-edible, allowing the pet owner to re-fill with edible stuff. As a second non-limiting example, an edible skin that is non-reusable can be provided that can be eaten and digested by the animal.

Additional features, functions and benefits of the disclosed edible animal toy and methods in connection therewith will be apparent from the detailed description which follows, particularly when read in conjunction with the accompanying figures.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE DRAWINGS

It should be understood at the outset, that while this disclosure uses terminology such as "pet toy" and "dog toy," the use by a pet and/or dog is exemplary. The present toy can be used by any species of animal (e.g., dog, cat, mouse, tiger, bear, etc.) and any type of animal (pet animal, zoo animal, wild animal, etc.) while remaining within the scope of the present disclosure.

Figure 1:
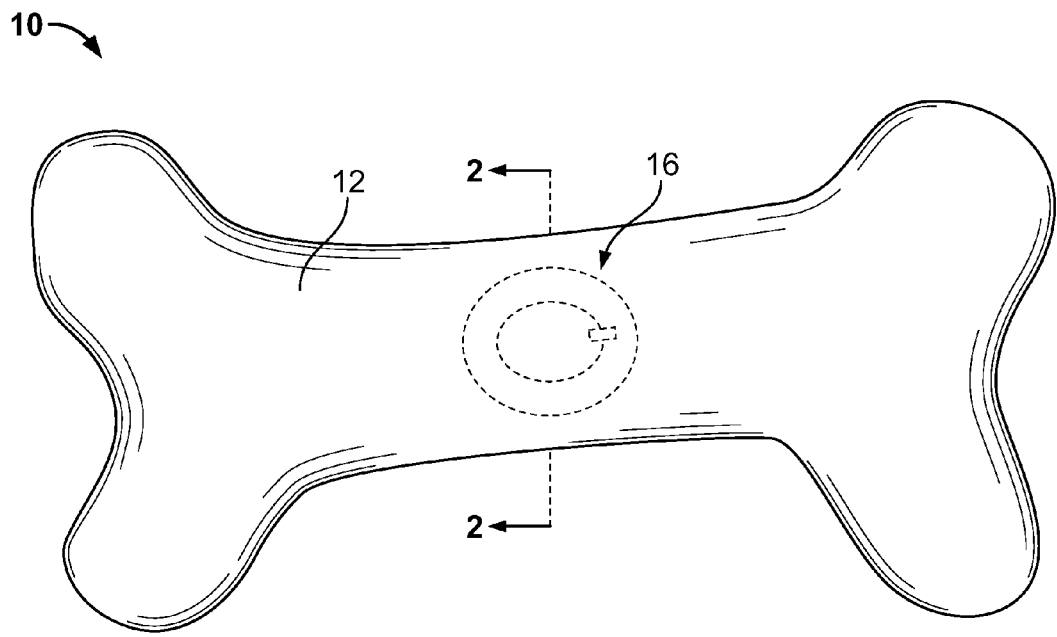
FIG. 1 is a perspective view of an animal toy, including a noise making device, in accordance with an exemplary embodiment of the present disclosure.
Figure 2:
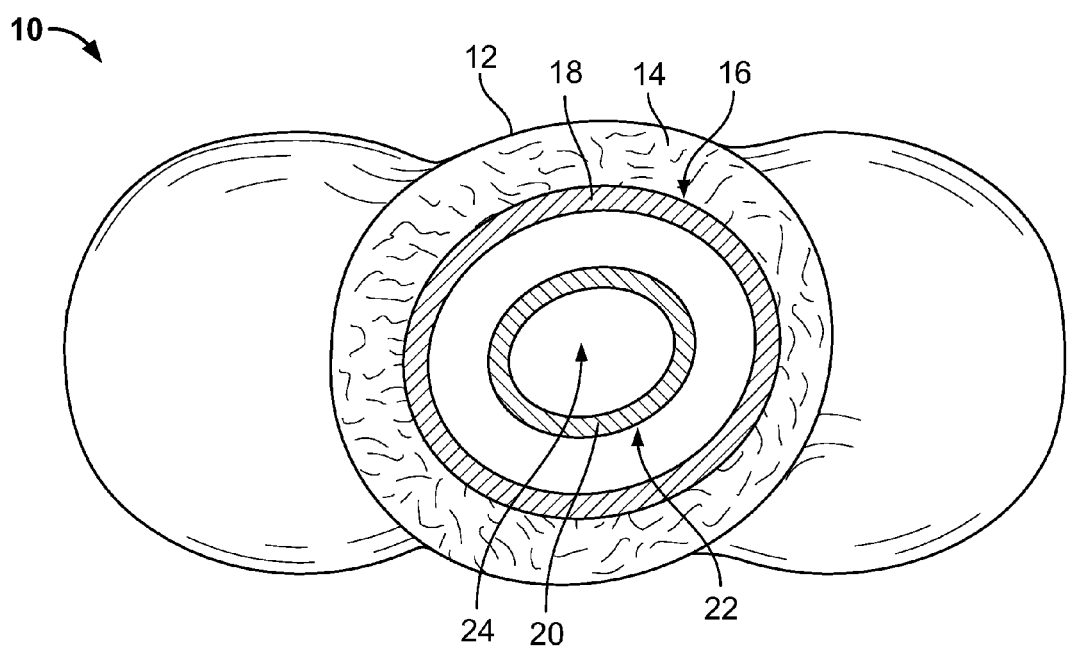
FIG. 2 is a sectional view of the animal toy of FIG. 1 taken along section line 2-2 of FIG. 1.
Figure 4:
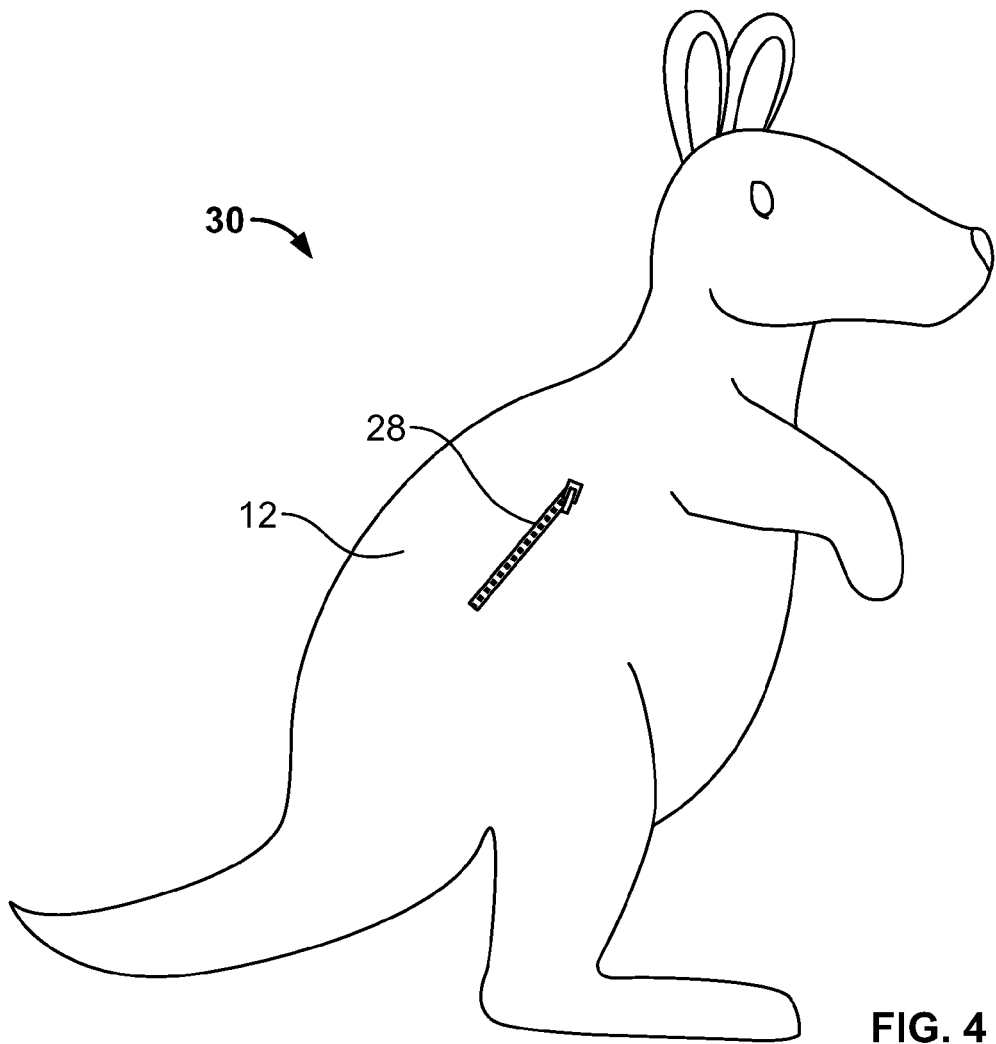
FIG. 4 is a perspective view of an animal toy, in accordance with another exemplary embodiment of the present disclosure.

Referring to FIGS. 1-2, a pet toy including a noise making device is shown in accordance with an exemplary embodiment. The pet toy 10 comprises an outer cover 12 that defines an interior chamber, which contains filling material 14 and a noise making device 16. While FIGS. 1-2 show a pet toy 10 that is in the shape of a dog bone, it should be well understood that the pet toy 10 can have any size, shape and/or configuration while remaining within the scope of the present disclosure. For example, FIG. 4 shows a pet toy 30 that is in the shape of an animal (e.g., a kangaroo).

While FIGS. 1-2 show a noise making device 16 disposed near or within a central region of the dog toy 10, this disclosure is not limited thereto. Rather, the noise making device 16 can be located anywhere within an interior of the pet toy 10. Also, the pet toy 10 can include any number of noise making devices 16.

Figure 3:
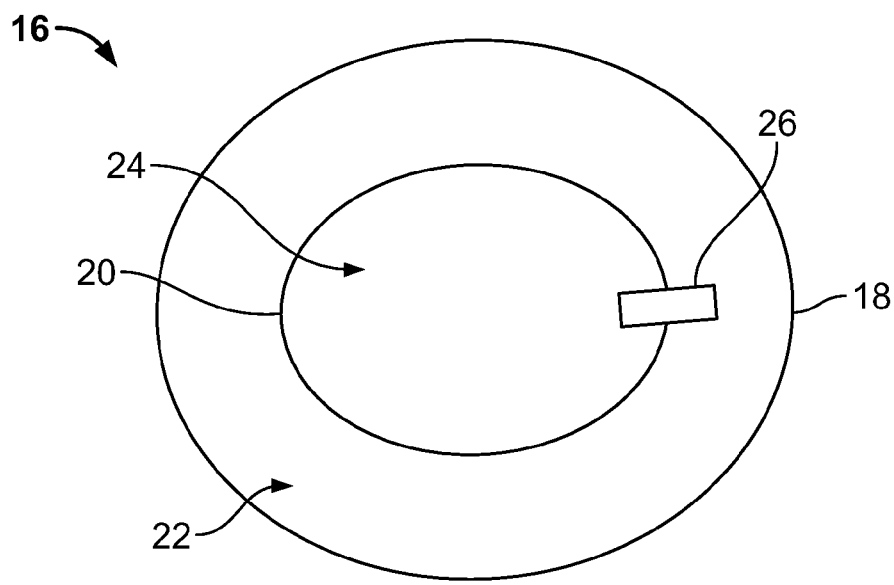
FIG. 3 is a perspective view of the noise making device of FIG. 1.

As seen in FIGS. 1-3, the noise making device 16 can comprise a "squeaker" that makes a squeaking sound upon manipulation thereof. The squeaker can have a squeaker housing 20 and a reed 26 protruding therefrom. In some embodiments, the noise making device 16 includes an outer casing 18 that contains the squeaker. However, it should be appreciated that the dog toy 10 does not need to have the outer casing 18. Rather, the squeaker can be disposed in the interior of the toy 10 such that the squeaker housing 20 and reed 26 are surrounded by and/or in direct contact with the filling material 14. In cases where the toy 10 includes the outer casing 18, the outer casing 18 can define a first chamber 22 containing air, and the squeaker housing 20 can define a second chamber 24 containing air. The reed 26 can provide communication between the air in the first chamber 22 and the air in the second chamber 24. The squeaker housing can be made of a resilient, flexible material. As such, when the squeaker housing 20 is compressed (e.g., when a pet bites the pet toy 10 so to compress the noise making device 16), air travels from the second chamber 24 into the first chamber 22 via the reed 26. When the squeaker housing 20 is released from compression (e.g., when the pet releases its bite on the pet toy 10), air travels from the first chamber 22 into the second chamber 24 via the reed. As the air travels through the reed 26, from the second chamber 24 to the first chamber 22 upon compression, and/or from the first chamber 22 to the second chamber 24 upon release, a sound (e.g., a "squeak") is produced. In cases where the toy 10 does not include the outer casing 18, then the reed 26 provides communication between the air within the outer cover 12 and the air in the second chamber 24, and in turn the reed 26 produces a sound (e.g., a "squeak"). In order to allow the pet to manipulate the squeaker housing 20, the casing 18, filling material 14, and outer cover 12 are preferably made of one or more flexible materials, the details of which are described below. It should be appreciated by those of ordinary skill in the art that the noise making device 16 need not be a "squeaker," and can be any type of device that makes noise upon manipulation thereof.

One or more of the outer cover 12, the filling material 14, or the noise making device 16 is made of at least one edible or digestible material. For example, one or more of the outer cover 12, the filling material 14, or the noise making device 16 can be chewable and have a level of robustness for providing a substantial duration (e.g., several minutes, several hours, several days, etc.) of enjoyable playtime for the animal, but which, when eaten, will soften and/or dissolve, and be easily digested by the animal. Within the context of the current disclosure, the term "edible" is intended to mean safe to eat, and which causes little or no harm to an animal as it is ingested and digested. Thus, a material that is edible for a dog is intended to mean a material that is safe (e.g., does not pose health and/or physiological concerns) for a dog to ingest. Within the context of the current disclosure, the term "digestible" is intended to mean edible (i.e., safe to eat, and which causes little or no harm to an animal as it is ingested and digested) and/or providing nutritional value to the animal, for example, nutrients for bio assimilation to promote energy and/or growth. Nutrients which promote energy and/or growth could include, but are not limited to, vitamins, supplements, medicines, etc. Thus, a material that is digestible for a dog is intended to mean a material that is edible for a dog, and which provides the dog with nutrients to promote energy and/or growth.

In some embodiments, the outer cover 12 is made of an edible material that is strong enough to sustain a pet's manipulation of the pet toy 10, and that is also flexible enough to allow the pet to activate the noise making device 16 through its manipulation. For example, the outer cover 12 can comprise material that includes one or more of cellulous, corn starch, potato starch, rice starch, rice flour, plant fibers, etc. In some embodiments, the outer cover 12 comprises plant fibers. In some embodiments, the outer cover 12 is made entirely of one or more edible materials (e.g., does not contain any non-edible materials). In some embodiments, the outer cover 12 is made of one or more materials that are digestible. In some embodiments, the outer cover 12 is made of one or materials that are dissolvable upon contact (and/or upon extended contact) with a pet's saliva. In some embodiments, the outer cover 12 can be made entirely of one or more digestible materials. The outer cover 12 can include nutritional components, such as vitamins, minerals, and/or medicinal substances (e.g., prescription medicine for the animal). Additional examples of a suitable edible or digestible material are grass, straw, materials of plant origin, fruits, vegetables, starches and/or other materials derived from fruits and vegetables. The outer cover 12 can comprise a cloth and/or woven material that is spun from an edible material. The outer cover 12 could also include an edible material in a variety of flavors including, but not limited to, peanut butter and/or bacon.

The filling material 14 can be made of an edible material that provides the pet toy 10 with a soft, plush configuration and which allows a pet to manipulate the noise making device 16. For example, the filling material 14 can emulate cotton material so to give the pet toy 10 a plush feel. The filling material can include one or more of cellulous, corn starch, potato starch, rice starch, rice flour, plant fibers, etc. In some embodiments, the filling material 14 comprises plant fibers. In some embodiments, the filling material 14 is made entirely of one or more edible materials (e.g., does not contain any non-edible materials). In some embodiments, the filling material 14 is made of one or more materials that are digestible. In some embodiments, the filling material 14 is made of one or materials that are dissolvable upon contact (and/or upon extended contact) with a pet's saliva. In some embodiments, the filling material 14 can be made entirely of one or more digestible materials. The filling material 14 can include nutritional components, such as vitamins, minerals, and/or medicinal substances (e.g., prescription medicine for the animal). Additional examples of a suitable edible or digestible material are grass, straw, materials of plant origin, fruits, vegetables, starches and/or other materials derived from fruits and vegetables. The filling material 14 can comprise a stuffing material that is spun from an edible material. The filling material 14 could also include an edible material in a variety of flavors including, but not limited to, peanut butter and/or bacon.

The noise making device 16 is made of an edible material that is configured to support the operability of the noise making feature. For example, in cases where the noise making device 16 is a squeaker, the casing 18, the squeaker housing 20, and the reed 26 can be made of an edible material. The squeaker housing 20 can be made of a material that demonstrates sufficient rigidity to sustain pressure for compressing the squeaker housing 20 (e.g., pressure from an animal's teeth), sufficient flexibility to compress upon such pressure, and sufficient resilience to expand when the pressure is released. The reed 26 can be made of an edible material that can create an audible noise when air travels in at least one direction therethrough (e.g., from the first chamber 22 to the second chamber 24, and/or from the second chamber 24 to the first chamber 22). The casing 18 can be made of an edible material that is sufficiently flexible to allow a pet to compress the squeaker housing 20, and which is sufficiently strong to seal the air that is within the first and second chambers 22, 24, and the remaining interior space within the outer cover 12. For example, one or more of the casing 18, the housing 20, or the reed 26 can be made of a rawhide material. One or more of the casing 18, the housing 20, or the reed 26 can be made of a material comprising one or more of cellulous, corn starch, potato starch, rice starch, rice flour, plant fibers. In some embodiments, one or more of the casing 18, the housing 20, or the reed 26 is made of one or more materials that are digestible. In some embodiments, the outer cover 12 is made of one or materials that are dissolvable upon contact (and/or upon extended contact) with a pet's saliva. The noise making device 16 can include nutritional components, such as vitamins, minerals, and/or medicinal substances (e.g., prescription medicine for the animal). Additional examples of a suitable edible or digestible material are grass, straw, and/or materials of plant origin. The noise making device 16 can comprise a material that is injection molded from an edible material. In some embodiments, one or more of the casing 18, the housing 20, or the reed 26 can be made entirely of one or more digestible materials. The noise making device 16 could also include an edible material in a variety of flavors including, but not limited to, peanut butter and/or bacon.

Now turning to FIG. 4, shown is an embodiment of a pet toy 30, comprising a sealing device 28 and a re-sealable opening, so to allow removal and/or replacement of the filling material 14 and/or the noise making device 16. The pet toy 30 can include filling material 14 similar to that discussed above with reference to FIGS. 1-3. Also, the pet toy can include a noise making device 16 similar to that discussed above with reference to FIGS. 1-3. While FIG. 4 shows a sealing device 28 that is a zipper, those of ordinary skill in the art will appreciate that the sealing device 28 need not be a zipper and that other types of sealing devices 28 (e.g., hook and loop fasteners) are contemplated. For example, the sealing device 28 may include any type of mechanism that allows a user and/or pet to open the re-sealable opening to gain access to an interior of the outer cover 12, and close the re-sealable opening to retain the filling material 14 and noise making device 16 within the outer cover 12. In some embodiments, the outer cover 12 and sealing device 28 are not made of an edible material, while the filling material 14 and the noise making device 16 are made of an edible material. The outer cover 12 can be made of a nonedible material that provides sufficient durability so to be reusable. For example, the outer cover 12 can be made of a washable material (e.g., a material that can experience multiple cycles of a washing machine, a dishwasher, etc. without losing sufficient structural integrity).

In operation, when a pet plays with the pet toy 30, the pet can manipulate the noise making device 16 to cause the noise making device 16 to produce a sound (e.g., a squeak). The pet can also manipulate the toy so to unseal the sealing device 28 and access the filling material 14 and noise making device 16. Thus, the pet can safely play with and/or eat the filling material 14 and/or the noise making device 16. Afterwards, an animal owner or other user can refill the outer cover 12 with another filling material 14 and/or another noise making device 16, and allow the pet to play with the pet toy 30 again. Then, the dog can again manipulate the toy so to unseal the sealing device 28 and access the filling material 14 and the noise making device 16. Thus, the pet can again play with and/or eat the other filling material 14 and/or the other noise making device 16. The outer cover 12 can be made of a sufficiently durable material so to allow this process to be repeated multiple times.

The pet toy 10, 30 can be intended for use by any type of animal, for example, by dogs, cats, mice, etc. The size, shape and/or configuration of the pet toy 10, 30 can vary according to the type and/or age of the animal intended to play with the pet toy 10, 30. The particular materials used to construct the pet toy 10, 30 can be chosen according to the particular animal that is intended to play with the pet toy 10, 30. For example, if a pet toy 10, 30 is intended for a dog's amusement, then it may be larger in size than a pet toy 10, 30 that is intended for a cat's amusement. Also, a pet toy 10, 30 that is intended for a dog's amusement may comprise materials that are edible or digestible by a dog, but not by a cat.

Thus, the outer cover 12, the filling material 14, and/or the noise making device 16 can be designed, developed, and/or compounded from one or more materials that are chewable and have a high level of robustness which will provide a duration of enjoyable playtime for the animal, but which, when eaten, will soften and/or dissolve, and be easily digested by the animal. The pet toy 10, 30 eliminates the mess created when an animal removes components (e.g., the filling material 14 and/or the noise making device 16) by producing such components in a way that the animal can ingest them safely. Also, the dog toy 10, 30 reduces or eliminates the risk of choking or other harm to the animal that is associated with incumbent designs.

Thus the present disclosure provides advantageous dog toys with edible or digestible components. Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A animal toy, comprising
an outer cover defining a chamber, the chamber containing a filling material and a noise making device,
wherein the outer cover, the filling material, and the noise making device are each made entirely of at least one material that is edible for an animal; and
wherein the outer cover is made of a first edible material, the filling material is made of a second edible material, and the noise making device is made of a third edible material, and wherein at least one of the first edible material and the second edible material comprises at least one of edible cellulous, corn starch, potato starch, rice starch, rice flour, plant fibers, fruits, vegetables, starches, material derived from fruit, and material derived from vegetables.

2. The animal toy of claim 1, wherein the animal is a dog.

3. The animal toy of claim 1, wherein the toy is made entirely of at least one edible material.

4. The animal toy of claim 1, wherein at least one of the edible materials is digestible.

5. The animal toy of claim 1, wherein the outer cover includes an opening and a sealing device for reconfiguring the pet toy from an open configuration to a closed configuration,
wherein, in the open configuration, access is provided into the chamber from a region external of the chamber so to allow a user to remove and replace at least one of the noise making device and the filling material, and in the closed configuration, access into the chamber is substantially blocked from the region external of the chamber.

6. The animal toy of claim 5, wherein the sealing device comprises a zipper.

7. The animal toy of claim 5, wherein the sealing device comprises a hook and loop fastener.

8. The animal toy of claim 1, wherein the third edible material comprises rawhide.

9. The animal toy of claim 1, wherein at least one of the edible materials comprises a flavor.

10. The animal toy of claim 9, wherein the flavor is at least one of peanut butter flavor and bacon flavor.

11. The animal toy of claim 9, wherein at least one of the edible materials is digestible.

12. The animal toy of claim 1, wherein at least one of the edible materials is enhanced with at least one of a vitamin, a supplement, and medicine.

13. The animal toy of claim 1, wherein the outer cover comprises a reusable outer cover.

\* \* \* \* \*